Figure 1:
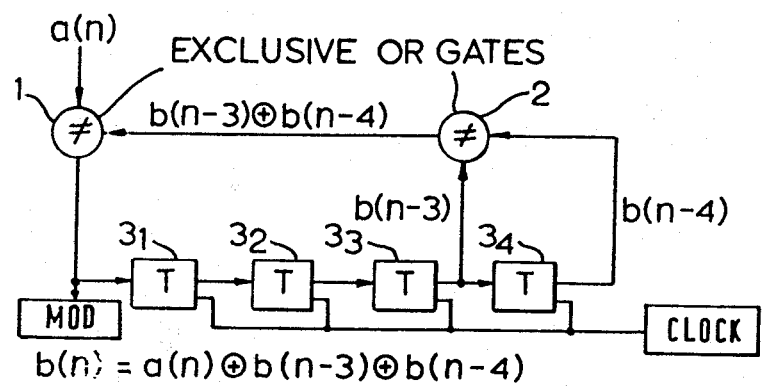

United States Patent [19]

Franklin

[11] 4,286,333
[45] Aug. 25, 1981

[54] DATA TRANSMISSION

[75] Inventor: Donald P. Franklin, Wells, England

[73] Assignee: E M I Limited, Hayes, England

[21] Appl. No.: 937,521

[22] Filed: Aug. 28, 1978

[30] Foreign Application Priority Data

Aug. 27, 1977 [GB] United Kingdom ............ 36101/77

[51] Int. Cl.³ .................... H04B 15/00; H04K 1/04
[52] U.S. Cl. ............................. 375/1; 370/21; 375/52; 375/83
[58] Field of Search ............ 178/22, 66 R, 67; 325/42, 65, 323, 474, 479, 477, 32, 324; 179/15 AP, 1.5 R; 364/728, 819, 824; 375/1, 52, 67, 83, 96; 370/21, 107

[56] References Cited

U.S. PATENT DOCUMENTS

| 2,701,305 | 2/1955 | Hopper | 179/15 BA |
|---|---|---|---|
| 2,982,853 | 5/1961 | Price et al. | 364/824 |
| 3,305,636 | 2/1967 | Webb | 370/107 |
| 3,475,558 | 10/1969 | Cahn | 179/15 |
| 3,518,547 | 6/1970 | Filipowsky | 370/21 |
| 3,649,915 | 3/1972 | Mildonian, Sr. | 325/42 |
| 3,659,046 | 4/1972 | Angeleri et al. | 325/32 |
| 3,731,198 | 5/1973 | Blasbalg | 325/42 |
| 3,911,216 | 10/1975 | Bartell et al. | 178/22 |
| 3,931,473 | 1/1976 | Ferris, Jr. | 370/107 |
| 3,980,945 | 9/1976 | Bickford | 178/67 |
| 4,041,391 | 8/1977 | Deerkoski | 325/42 |
| 4,092,601 | 5/1978 | Lee et al. | 375/1 |

Primary Examiner—Benedict V. Safourek
Attorney, Agent, or Firm—Fleit & Jacobson

[57] ABSTRACT

An arrangement for spectrum spreading of a signal for a data transmission link by providing the signal as a bipolar waveform and modulating it on a fast pseudo-random bipolar binary pulse train. In this invention the pseudo-random pulse train is generated at least in part in response to the data signal.

11 Claims, 4 Drawing Figures

DATA TRANSMISSION

The present invention relates to data transmission arrangements and is particularly related to data transmission over links, such as relatively long distance links, which may be subject to interference.

In known transmission arrangements, such as for example radio links between a number of individual units and one or more controlling or supervising units, the transmitted signals may be subject to noise as both narrow band and wide band interference.

To reduce the effects of such interference the signal may be arranged to occupy a much greater bandwidth than the base bandwidth of the data being conveyed. This technique, which may be called spectrum spreading, increases the probability of receiving some useful signal not excessively degraded by noise. If the noise is deliberately introduced, as jamming signals, the spectrum spreading forces the jammer to dissipate its power over the entire signal band. With some implementations of the technique, this reaction may be beneficial.

A well known technique of covering a wide bandwidth involves the use of wideband frequency modulated (f.m.) signals. When the amplitude probability distribution of the modulation waveform is well spread, as for audio or video analogue signals, the frequency spectrum of the modulated output is also evenly distributed. However, f.m. with a binary modulating waveform corresponds to shifting the instantaneous frequency from one value to another and back, known as frequency shift key (f.s.k.) coding. If the bit rate is much less than the frequency deviation (say half the difference between them), power tends to be concentrated about the two frequency values so that the signal is vulnerable to interference concentrated at those frequencies. The sparse wideband f.m. is unsatisfactory unless the gaps in the transmitted spectrum can be filled in, for example by an increase in bit rate or by random frequency agility.

An alternative application of f.m. is to sweep the instantaneous frequency over its full range in each data interval. The signal is received via a matched (compressive) filter. This is not entirely satisfactory since deliberately induced interference can readily be caused to simulate the modulation once it has been determined.

Because of these deficiencies it has become practice to phase reverse the binary data signal in a random manner to provide another binary waveform at a much higher effective bit rate. It is arranged so that the process may later be reversed by a circuit fed with the corresponding key. Conventionally this is done by adopting a bipolar (+ or −) data waveform, rather than unipolar (1 or 0), and causing it to modulate a fast pseudo-random bipolar binary pulse train. To recover the data it is necessary to cross-correlate the received fast binary waveform with a replica pseudo-random waveform in the correct relative phase. In such systems the fast sequence is determined under the control of a steady clock pulse train and serves effectively as a carrier in a suppressed carrier double sideband pulse-amplitude-modulated system. Changes in the data input invert the fast bit sequence but leave unchanged its phase within the repetition cycle.

With such systems, the repetition period of the code sequence is deliberately made long, with the result that the time taken to ascertain the correct phase for the replica is considerable. This imposes the loss of a correspondingly large amount of data while resynchronising after an interruption of reception.

It is an object of this invention to provide an alternative system capable of rapid synchronisation.

According to another aspect of the invention, there is provided a spread spectrum transmitter for transmitting a binary data signal including means for deriving a pseudo-random pulse train, having a greater bit rate than the data signal, at least in part from the data signal, means for modulating the pseudo-random pulse train with the data to produce a signal of greater bandwidth than the data signal, and means for phase shift key modulating an RF carrier with the said signal of greater bandwidth.

A spread of spectrum receiver for receiving an RF carrier phase shift key modulated by a pseudo-random pulse train modulated by a binary data signal which pulse train is derived at least in part from the data signal, comprising a demodulator for recovering the modulated pseudo-random pulse train, delay means arranged to receive the modulated pulse train, means for producing a combination of signals subject to different delays in the delay means to produce a replica of the pseudo-random pulse train, and cross-correlating means having a first input coupled to the combination producing means, a second input coupled to the demodulator, and an output, to cross-correlate the signals received at said inputs to produce at the output the data signal.

According to a further aspect of the invention, there is provided a spread spectrum receiver for receiving a coherent RF carrier which is phase shift key modulated by a signal derived from data by generating a pseudo-random binary pulse train having a greater bit rate than the data signal at least in part from the data signal, the train being modulated with the data to produce the said signal, the receiver including:

an input for receiving the modulated RF carrier, delay line sections coupled to the input, at least one balanced modulator for combining signals subject to different delays in the delay line sections, and a further balanced modulator having a first input coupled to said input and a second input coupled to the said at least one balanced modulator to cross-correlate the signals received at the first and second inputs.

According to a yet further aspect, there is provided a special spectrum system for transmitting and receiving binary data wherein a spread spectrum transmitter includes:

means for generating a pseudo-random binary pulse train, having a greater bit rate than the data signal, at least in part from the data signal, means for modulating the pseudo-random pulse train with the data signal to produce an increased bandwidth signal, and means to phase shift key modulate a coherent RF carrier with the increased bandwidth signal to produce a spread spectrum signal, and wherein a spread spectrum receiver includes:

an input for receiving the spread spectrum signal delay line coupled to the input, at least one balanced modulator for combining signals subject to different delays in the delay line sections, and a further balanced modulator having a first input coupled to the said input and a second input coupled to the said at least one balanced modulator to cross-correlate the signals received at the first and second inputs.

Figure 2:
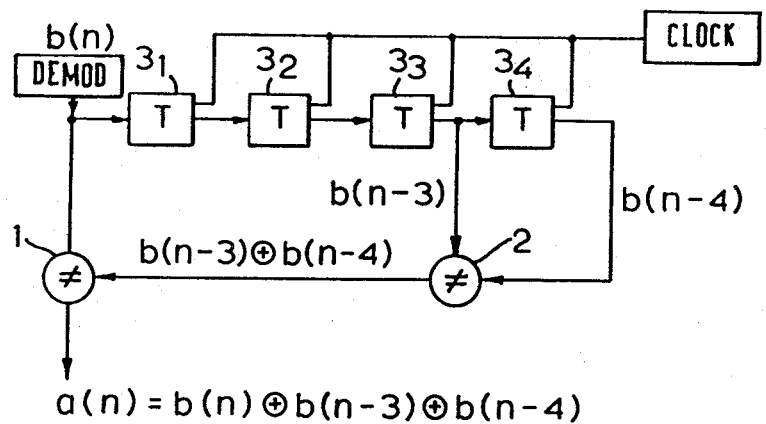
Figure 3:
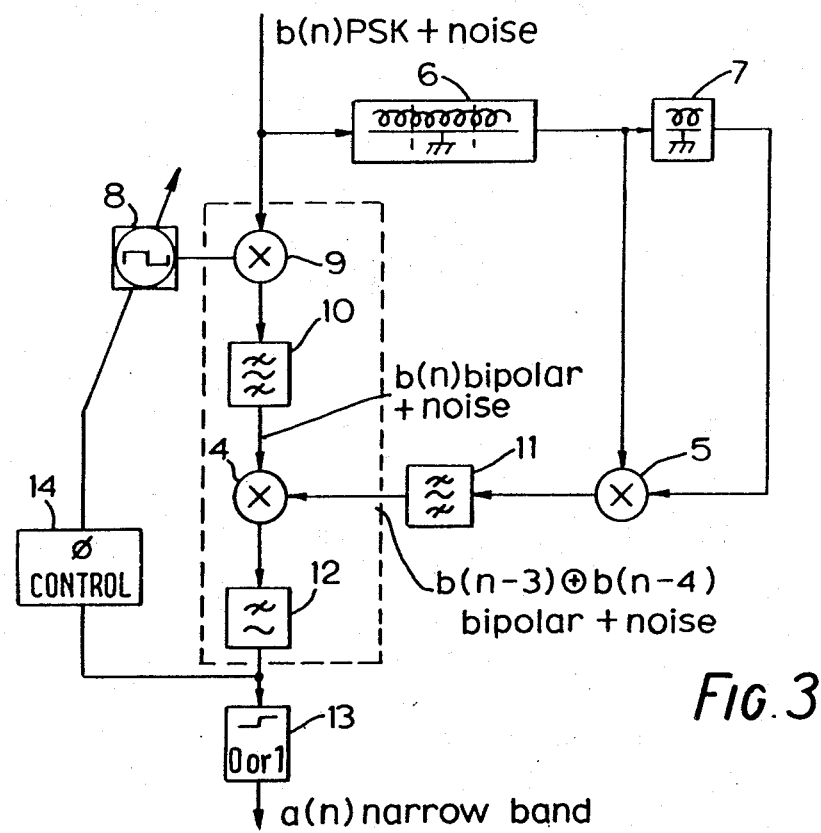
Figure 4:
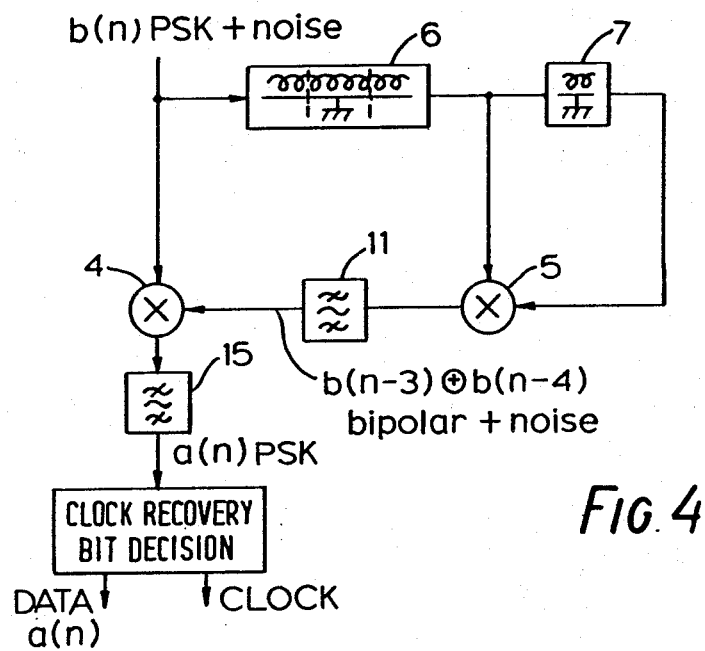

In order that the invention may be clearly understood and readily carried into effect, examples thereof will now be described with reference to the accompanying drawings of which FIG. 1 shows a circuit for spectrum spreading, FIG. 2 shows a circuit for recovering the original signal, FIG. 3 is a linear equivalent of the circuit of FIG. 2, and FIG. 4 is an alternative to the circuit of FIG. 3.

It has been found that, for data communication, it is possible to provide spectrum spreading using sequences whose generation is responsive to the data input. Because of the disparity between the bit periods of the input data and the output code, in relative terms the data are static over long periods and can enter into the sequence generation logic without unduly disturbing the random properties of the resulting sequence.

The operation can be seen in an example of a simple code generator based on a 4-bit shift register implementing the recurrence equation $$b(n)=b(n-3)\oplus b(n-4) \quad (1)$$

Where $b(n)$ is the value of the nth bit corresponding to the nth clock pulse and the symbol $\oplus$ represents modulo 2 addition as provided by the exclusive OR operation.

This is known to provide the repetitive 15-bit maximum length pseudo-random sequence.

—011010111100010— whose power is approximately uniformly spread over its bandwidth.

If $b(n)$ is defined instead by $$b(n)=a(n)\oplus b(n-3)\oplus b(n-4) \quad (2)$$

then for $a(n)=0$ and the same initial conditions the same sequence will result. However, for $a(n)=1$ the resulting $b(n)$ follows the same sequence but inverted:

—100101000011101—

This inversion holds for expressions for $b(n)$ that contain an even number of feedback terms. Thus if $a(n)$ is provided by the data input, which by definition is steady over many consecutive values of n, then the resulting $b(n)$ possesses desirable spread-spectrum properties and may be taken as the output.

A suitable circuit for implementing one aspect of the invention is shown in FIG. 1. The modulo 2 addition is provided by exclusive OR gates 1 and 2 and the memory required is provided by stages $3_1$—$3_4$ of a shift register, each of which gives a delay T of one clock period. The shift register is clocked by a clock at a rate much greater than the rate of production of the data.

In the time leading up to the nth clock pulse, stages $3_1$ to $3_4$ hold binary values $b(n-1)$ to $b(n-4)$ respectively. Consequently gate 2 gives a logical output $b(n-3)\oplus b(n-4)$. To this is added the current data value, $a(n)$, in gate 1 to give $a(n)\oplus b(n-3)\oplus b(n-4)$. This comprises modulating the fast pseudo-random pulse train $b(n-3)\oplus b(n-4)$ with the data waveform $a(n)$. When the nth clock pulse occurs, stage $3_1$ assumes this value, and all previously held values shift one stage to the right. Thus stages $3_1$ to $3_4$ now hold values $b(n)$ to $b(n-3)$ respectively. It will therefore be apparent that the circuit of FIG. 1 implements equation 2 where $a(n)$ and $b(n)$ refer to the values obtaining just prior to the nth clock pulse.

It should be noted that, using equation 2, it is possible to choose a phase (n) in the output sequence for the inversion of the value of $a(n)$, which will cause the shift register to contain that sequence of either all 0's or all 1's which is normally excluded. This would then be perpetuated until the next inversion of $a(n)$. With long codes there is only a low probability of this occurring. However, logical precautions may be taken, such as holding the transition for one bit period, to prevent the occurrence of the prohibited state.

The signal $b(n)$ is a coded data signal of bandwidth greater then the bandwidth of the data signal $a(n)$. The signal $b(n)$ is fed to a modulator MOD where it is modulated with an RF carrier to produce a spread spectrum signal, in a known manner; (see for example spread spectrum systems—R. C. Dixon—John Wiley & Sons). The modulation is phase shift key modulation of the carrier.

The spread spectrum signal may be demodulated in a demodulator (DEMOD) and the coded data signal fed to the circuit shown in FIG. 2.

For recovery of the data, equation 2 is modified by (modulo 2) adding $a(n)\oplus b(n)$ to each side. Since $X\oplus X=0$ for all X this gives:

$$a(n)=b(n)\oplus b(n-3)\oplus b(n-4)$$

Thus the original $a(n)$ can be recovered from the b sequence (apart from errors) once the shift register has been given time to fill. This is also the time for recovery of synchronisation following an interruption of the received bit stream, and is shorter than in prior art arrangements. FIG. 2 shows an implementation of equation (3) which uses the same components as FIG. 1. This circuit derives from the transmitted waveform a replica of the original pseudo-random waveform $b(n-3)\oplus b(n-4)$ and cross-correlates it with the transmitted waveform to recover the original $a(n)$.

Circuit configurations like those of FIGS. 1 and 2 have been proposed as scramblers and unscramblers in line communications applications, where it is not usually desired to increase the bandwidth occupied and the output bit rate is the same or of the same order as the data input.

(See for example Savage J. E. Some simple Self Synchronising Digital Data Scramblers, Bell Systems Technical Journal 46 pp. 449–487 February 1967).

Thus in scrambling and unscrambling the rate of clocking the shift register is the same or of the same order as the rate of production of the data. In these circumstances it is ensured that the signal level at the receiver is sufficient to give a low error rate in the recovered $b(n)$ and hence of $a(n)$. However, when the aim is to transmit a spread spectrum signal over a noisy wideband channel, the probability of making the correct binary decision for each incoming $b(n)$ may be small. It is therefore desirable to postpone making a logical decision in this instance until operating at a lower bandwidth where the corrupting noise power has been reduced to well below the signal level.

This can be achieved by adopting linear circuits throughout for handling the combined signals and noise. FIG. 3 shows the linear equivalent of FIG. 2 in which the b(n) sequence has been made to phase shift key (PSK) modulate a coherent carrier. The modulo 2 additions are replaced by balanced modulators 4, 5 (which are linear in a restricted sense) and the shift register stages 3 are replaced by sections of a delay line 6, 7, whose delays are three bit periods and one bit period respectively. A local clock generator 8 runs with a nominal period of T. It provides an input to a further balanced modulator 9 and thus demodulates the undelayed signal into its bipolar binary equivalent. Bandpass filters 10 and 11 remove the carrier and harmonies from the outputs of 9 and 5 while permitting the longest run of consecutive + bits (in this example 4T) to pass undistorted. The required components of the two bipolar inputs to balanced modulator 4 are coherent and provide the desired bipolar version of a(n). In contrast, interference is incoherent with the desired signals, as it is with itself when delayed, and generally is wideband. Narrow band interference gives rise to only low frequency at the output of modulator 5, and these are removed by filter 11. A lowpass filter 12 is therefore able to pass the data signal while substantially attenuating the accompanying noise power. The attenuation characteristic of filter 12 is preferably shaped in the conventional way so as to minimise inter-symbol interference. The band-limited signal then passes to a polarity detector 13 which delivers a + or − binary decision to the output.

The amplitude of the signal at the output of 12 depends on the phase of the pulses from 8 relative to the incoming bits and, in the event of their being in quadrature, is zero. Accordingly 8 must provide two quadrature outputs and the part of the circuit shown within the broken line is implemented in duplicate. Initially, one or other of the duplicates of 12 will provide sufficient output for a decision to be made in detector 13. Thereafter the phase of 12 can gradually and automatically be adjusted to optimum by a phase control 14.

As a numerical example, it will be assumed that the data rate is 20 Kb/s and is to be randomised at 20 Mb/s to give a bandwidth increase of 1000:1 or 30 dB. The recurrence chosen is given by $$b(n) = a(n) \oplus b(n-13) \oplus b(n-33)$$

whose repetition period is about 7 minutes. Then delays 6 and 7 would be 0.65 μs and 1.00 μs respectively, accurate and stable to 10 ns or less. The bandpass filters 10, 11 should pass frequencies between 150 kHz and 15 MHz and the low pass filter 12 cut off between 15 20 KHz.

An alternative to filtering at the baseband is to band pass filter about the carrier frequency as shown in FIG. 4 with a narrow band filter 15 centered on the carrier frequency. The output of 15 gives a carrier signal which is quasi continuous in phase, being PSK modulated at the bit rate of the data and accordingly occupies only a narrow bandwidth. By contrast, any interference power at the output of modulator 4 is wideband and is strongly attenuated by filter 15. If desired, the narrow-band filtering can be executed at a lower frequency by means of heterodyning, preferably with the local oscillator at a sub-multiple of the carrier. Clock and bit recovery from the PSK waveform can then be performed in the conventional way. Where the heterodyne technique is adopted, the phase of the local oscillator could, with advantage, be continuously optimised. It should be noted that the delay of 6 should here be made less than nominal to allow for the group delay of 11.

What I claim is:

1. A spread spectrum system for transmitting and receiving binary data, wherein a spread spectrum transmitter includes:
    means for deriving according to a first predetermined recurrence relationship a pseudo-random binary pulse train having a greater bit rate than the data signal at least in part from the data signal;
    means for modulating the pseudo-random pulse train with the data signal to produce an increased bandwidth signal; and
    means to phase shift key modulate a coherent RF carrier with the increased bandwidth signal to produce a spread spectrum signal;
    and wherein a spread spectrum receiver includes:
    an input for receiving the spread spectrum signal;
    delay line sections coupled to the input and at least one balanced modulator for combining signals subject to different delays in the delay line sections according to a second predetermined recurrence relationship, the said first second predetermined relationships being such that the delay line sections and at least one balanced modulator derive the said pseudo-random binary pulse train only from the spread spectrum signal, and
    a further balanced modulator having a first input coupled to the said input for receiving the spread spectrum signal and a second input coupled to receive the said pseudo-random binary pulse train derived from the spread spectrum signal to cross-correlate that pulse train with the signal received at the first input to produce a signal comprising the data demodulated from the pseudo-random binary pulse train.

2. A system according to claim 1, wherein the means for deriving a pseudo-random binary pulse train of the transmitter comprises a delay means and means for producing, as said train, a combination of signals subjected to different delays in the delay means and the modulating means comprises an input for receiving the said data signal, a further input coupled to receive the said combination thereby to modulate the combination with the data signal, to produce the increased bandwidth signal, and an output coupled to the delay means to deliver thereto the modulated combination.

3. A system according to claim 2, wherein the delay means of the transmitter comprises a shift register having a plurality of stages, and a clock for clocking the shift register at a greater bit rate than the bit rate of the data signal, and the combination producing means of the transmitter is connected to combine the outputs of different stages of the register.

4. A system according to claim 3, wherein the said combination producing means comprises at least one adder.

5. A system according to claim 3, wherein the said combination producing means comprises at least one Exclusive-OR gate.

6. A system according to claim 1, wherein the receiver further includes demodulation means connected to the said input to demodulate the spread spectrum signal and to pass the demodulated signal to the said first input of the further balanced modulator.

7. A system according to claim 6 wherein the demodulating means includes a local clock generator and a balanced modulator.

8. A system according to claim 7 comprising means responsive to the output of the further balanced modulator to control the phase of the local clock generator.

9. A system according to claim 6 further including a band-pass filter connected between the demodulating means and the further balanced modulator to remove the carrier and its harmonics.

10. A system according to claim 6 further including a band-pass filter connected between the said at least one balanced modulator and the said second input of the further balanced modulator to remove the carrier and its harmonics.

11. A system according to claim 1 further including a narrow band filter, centred on the carrier frequency, connected to receive the output of the further balanced modulator.

* * * * *